United States Patent [19]

Saji et al.

[11] Patent Number: 5,129,035
[45] Date of Patent: Jul. 7, 1992

[54] METHOD OF GENERATING A NUMERICAL CALCULATION PROGRAM WHICH SIMULATES A PHYSICAL PHENOMENON REPRESENTED BY A PARTIAL DIFFERENTIAL EQUATION USING DISCRETIZATION BASED UPON A CONTROL VOLUME FINITE DIFFERENTIAL METHOD

[75] Inventors: Miyuki Saji, Funabashi; Chisato Konno, Inagi, both of Japan

[73] Assignee: Hitachi, Ltd., Tokyo, Japan

[21] Appl. No.: 361,283

[22] Filed: Jun. 5, 1989

[30] Foreign Application Priority Data

Jun. 6, 1988 [JP] Japan ............................. 63-139147

[51] Int. Cl.⁵ .................................................. G06F 15/328
[52] U.S. Cl. .................................... 395/1; 364/223;
364/224; 364/274; 364/274.1; 364/275;
364/275.1; 364/280.4; 364/924; 364/972.2;
364/972; 364/274.2; 364/DIG. 1; 395/10;
395/50; 395/60; 395/700
[58] Field of Search ... 364/200 MS File, 900 MS File, 364/191

[56] References Cited

U.S. PATENT DOCUMENTS 4,819,161  4/1989  Konno et al. .................... 364/300
4,841,479  6/1989  Tsuji et al. ....................... 364/900
4,972,334  11/1990  Yamake et al. .................. 364/200

OTHER PUBLICATIONS

R. I. Issa et al., The Computation of Compressible and Incompressible Recirculating Flows by Non-Iterative Implicit Scheme Journal of Computational Physics 62 pp. 62-86 (1986).

Chisato Konno, Advnaced Implicit Solution Function of DEQSOL and its Equation, Proceedings of IEEE Computer Society Computed Conference, Nov. 1986, pp. 1026-1033.

Primary Examiner—Thomas C. Lee
Assistant Examiner—Ken S. Kim
Attorney, Agent, or Firm—Antonelli, Terry, Stout & Kraus

[57] ABSTRACT

Method for generating a program for numerically solving a partial differential equation, wherein when a numerical calculation program for calculating, in a specified analytic domain, the value of a physical quantity defined by a partial differential equation is automatically produced, it is judged on the basis of predetermined conditions whether or not discretization due to the divergence of an operand is to be carried out for each of terms which are included in the partial differential equation and have a differential operator, and the discretization due to the divergence of the operand is carried out for a term when it is judged that the term is to be discretized on the basis of the divergence of the operand.

12 Claims, 14 Drawing Sheets

```
                                    101
MESH       X=(1:5:1), Y=(1:3:0.5)  ~1080
FREGION    ((1:5),(1:3))  ~106
REGION     LEFT=(1,(1:3))        ⎫
           RIGHT=(5,(1:3))       ⎪
           UP = ((1:5),3)        ⎬  ~105
           DOWN=((1:5),1)        ⎪
BCOND      DX(U) = β   at  LEFT  ⎪
           U = 1       at  RIGHT+DOWN
           U = α       at  UP    ⎭

SCHEME:
           SOLVE U OF LAPL(U) = α   ~10
END SCHEME:    ⎿109⏌      ⎿104⏌
```

FIG.5A

```
       DO 10 I = 1,5
       J = 1
       INDX = I + XMAX*J

**CONS(INDX) = 1              ⎫
       **MTRX3(INDX) = 1              ⎬ 141
    10 CONTINUE                      ⎭

DO 20 I = 2,4                  ⎫
       DO 20 J = 2                    ⎪
       INDX = I + XMAX*J              ⎪
                                      ⎪
       **CONS (INDX) = -α             ⎪
       **MTRX1(INDX) = 1/DLY(J+1)/((DLY(J+1)+ DLY(J))/2 )                                      ⎪
       **MTRX2(INDX) = (1-1/DLX(I+1))/((DLX(I+1)+ DLX(I))/2)                                   ⎬ 142
       **MTRX3(INDX) = (-1/DLX(I+1)-1/DLX(I))/((DLX(I+1)+DLX(I))/2)                            ⎪
                    + (-1/DLY(J+1)-1/DLY(J))/((DLY(J+1)+DLY(J))/2)                             ⎪
       **MTRX4(INDX) = (1/DLX(I)/((DLX(I+1)+DLX(I))/2)                                         ⎪
       **MTRX5(INDX) = (1/DLY(J)/((DLY(J+1)+DLY(J))/2)                                         ⎪
    20 CONTINUE                      ⎭

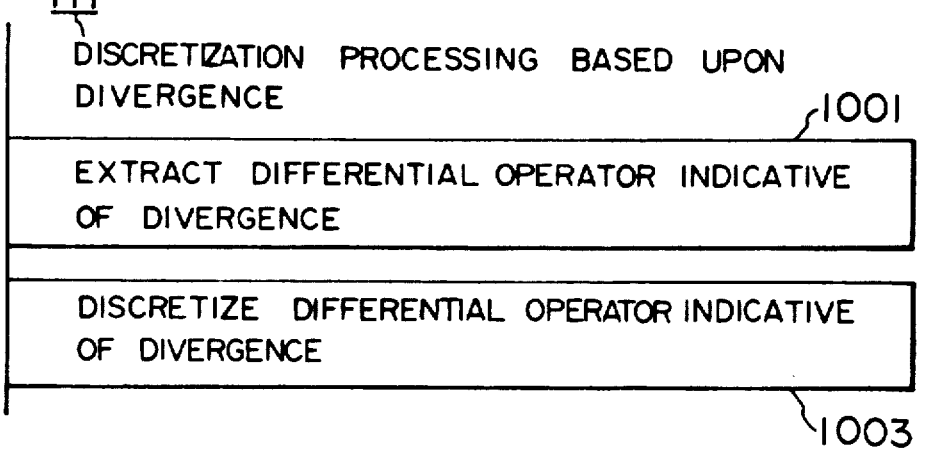

FIG. 8A

| DIFFERENTIAL OPERATOR | MEANING |
|---|---|
| DIV | DIVERGENCE AT CONTROL VOLUME |
| GRAD | GRADIENT |
| ROT | GRADIENT |

FIG. 8B

| EQUATION | POSITION OF $\frac{\partial}{\partial x}$, $\frac{\partial}{\partial y}$ AND $\frac{\partial}{\partial z}$ | MEANING |
|---|---|---|
| EQUATION INDICATING BOUNDARY CONDITION | FIRST DERIVATIVE | GRADIENT |
| PARTIAL DIFFERENTIAL EQUATION OF SECOND ORDER | INNER OPERATOR OF SECOND DERIVATIVE | GRADIENT |
| PARTIAL DIFFERENTIAL EQUATION OF SECOND ORDER | OUTER OPERATOR OF SECOND DERIVATIVE | DIVERGENCE AT CONTROL VOLUME |
| PARTIAL DIFFERENTIAL EQUATION OF SECOND ORDER | FIRST DERIVATIVE | DIVERGENCE AT CONTROL VOLUME |
| PARTIAL DIFFERENTIAL EQUATION OF FIRST ORDER | FIRST DERIVATIVE | DIVERGENCE AT CONTROL VOLUME |

| | INNER DISCRETE POINT (i,j) | DISCRETE POINT ON BOUNDARY LINE |
|---|---|---|
| DIVERGENCE AT CONTROL VOLUME | $\left(\dfrac{\partial u}{\partial x}\right)_{i,j} = \dfrac{u_{i+\frac{1}{2},j} - u_{i-\frac{1}{2},j}}{\Delta x}$ ~930 | $\left(\dfrac{\partial u}{\partial x}\right)_{i,j} = \dfrac{u_{i+\frac{1}{2},j} - u_{i,j}}{\Delta x/2}$ ~940 |
| GRADIENT | $\left(\dfrac{\partial u}{\partial x}\right)_{i,j} = \dfrac{u_{i+\frac{1}{2},j} - u_{i-\frac{1}{2},j}}{\Delta x}$ ~931 | $\left(\dfrac{\partial u}{\partial x}\right)_{i,j}$ = BOUNDARY CONDITION ~941<br>OR<br>$\left(\dfrac{\partial u}{\partial x}\right)_{i,j} = \dfrac{u_{i+\frac{1}{2},j} - u_{i,j}}{\Delta x}$ ~942 |

FIG. 12

$$\frac{\partial^2 u}{\partial x^2} - k\frac{\partial v^2}{\partial x^2} = a \quad \sim 104B$$

$$\frac{\partial u}{\partial x} = \beta + k\frac{\partial v}{\partial x} \quad \text{at LEFT side} \sim 105B$$

↓

$$\frac{\partial}{\partial x}(\frac{\partial u}{\partial x}) - k\frac{\partial}{\partial x}(\frac{\partial v}{\partial x}) = a \quad \sim 1002B$$

↓ 113B $$\frac{\{(\frac{\partial u}{\partial x})_{i+\frac{1}{2},j} - k(\frac{\partial v}{\partial x})_{i+\frac{1}{2},j}\} - \{\overline{(\frac{\partial u}{\partial x})_{i,j}} - k(\frac{\partial v}{\partial x})_{i,j}\}}{\Delta x/2} = a$$

↓

$$\frac{\{\cdots\}_{i+\frac{1}{2}} - \{(\beta_{i,j} + k(\frac{\partial v}{\partial x})_{i,j}) - k(\frac{\partial v}{\partial x})_{i,j}\}}{\Delta x/2} = a$$

118A
SECOND
INTERMEDIATE
DISCRETIZED
EQUATION

↓

$$\{\cdots\}_{i+\frac{1}{2}} - \beta_i / \Delta x/2 = a \quad \sim 1005$$

↓

$$\frac{(u_{i+1,j} - u_{i,j}/\Delta x)(v_{i+1,j} - v_{i,j}/\Delta x) - \beta_i}{\Delta x/2} = a \quad \sim 123B$$

FIG. 15

$$\frac{\frac{u_{i+1,j}-u_{i,j}}{\Delta x_{i+1}} - \frac{u_{i,j}-u_{i-1,j}}{\Delta x_i}}{\frac{\Delta x_{i+1} + \Delta x_i}{2}} \cdots = a \quad \text{—150}$$

FIG. 16

$$\underbrace{u_{i+1}\left(\frac{\frac{1}{\Delta x_{i+1}}}{\frac{\Delta x_{i+1}+\Delta x_i}{2}}\right)}_{172} + \underbrace{u_i\left(\frac{\frac{-1}{\Delta x_{i+1}}}{\frac{\Delta x_{i+1}+\Delta x_i}{2}} + \cdots\right)}_{173} + \underbrace{u_{i-1}\left(\frac{\frac{1}{\Delta x_i}}{\frac{\Delta x_{i+1}+\Delta x_i}{2}}\right)}_{174} - a = 0 \quad \text{—170}$$

METHOD OF GENERATING A NUMERICAL CALCULATION PROGRAM WHICH SIMULATES A PHYSICAL PHENOMENON REPRESENTED BY A PARTIAL DIFFERENTIAL EQUATION USING DISCRETIZATION BASED UPON A CONTROL VOLUME FINITE DIFFERENTIAL METHOD

BACKGROUND OF THE INVENTION

The present invention relates to a method of automatically producing a numerical calculation program for calculating a physical quantity which is defined by a partial differential equation, in a specified analytic domain under predetermined boundary conditions.

In order to solve a partial differential equation by numerical calculation, an analytic domain is divided into a plurality of small portions (namely, meshes), and an approximate value of a physical quantity which is defined by the partial differential equation, is determined at each of the vertices of the meshes. The vertices of the meshes are usually called "discrete points".

In order to obtain the above approximate value, a multiplicity of linear equations each indicating a relation between the value of the physical quantity at a discrete point in the analytic domain and the values of the physical quantity at neighboring discrete points, are formed from the partial differential equation and the boundary conditions.

The simultaneous linear equations thus obtained are solved to determine the value of the physical quantity at each discrete point.

The formation of the linear equations from the partial differential equation and boundary conditions is called "discretization", and the linear equations thus obtained are called "discretized equations". In more detail, each of the terms, which are included in the partial differential equation and have a differential operator, is replaced by a linear equation indicating a relation between the value of the physical quantity at a discrete point and the values of the physical quantity at neighboring discrete points, to eliminate a partial differential operator of the above term. This replacement is called "discretization of the above partial differential operator". In a case where the linear equation thus obtained still includes a partial differential operator, the discretization of this partial differential operator is carried out in a manner similar to the above-mentioned. The discretization can be carried out in various methods, one of which uses control volumes.

The discretization method using control volumes is described, for example, on pages 66 to 82 of the Journal of Computational Physics, Vol. 62, 1986. According to this method, as shown in FIG. 1 of the accompanying drawings, a rectangular analytic domain 130 is divided into a plurality of meshes, and a plurality of control volumes 501A and so on are formed so that each control volume contains one of the vertices of the meshes (namely, one discrete point). In each control volume, a partial differential equation is integrated so that discretization is carried out. Further, for a discrete point B existing on the boundary line of the analytic domain 130, a control volume 501B whose size is one half the size of the control volume 501A, is formed so that the discrete point B exists on one side of the rectangular control volume 501B. In the control volume 501B, the partial differential equation is integrated, to be discretized. At this time, an integrated term on the boundary line is replaced by a boundary condition. In the above case, a term having a differential operator indicative of the divergence of an operand such as a differential operator "div" is integrated and then discretized by using the integration by parts. The discretization method using control volumes will hereinafter be referred to as the "control volume method".

It is known that the control volume method can produce discretized equations which have an excellent calculation accuracy. However, the discretization according to the control volume method has hitherto been carried out manually, and thus it requires a great deal of labor to finish this discretization. Accordingly, it is desired to carry out the discretization automatically.

The technology for automatically producing a program which can solve a partial differential equation, is disclosed in U.S. Pat. Nos. 4,972,334, 4,841,479, and 4,819,161, each of which is assigned to the present assignee. Further, the above technology is disclosed in a publication entitled "Advanced Implicit Solution of Function of DEQSOL and it's Evaluation" (IEEE computer reprint, 1986, by Chisato Konno).

The discretization method used in the above-mentioned technology, however, is different from the control volume method, and hence the above technology cannot be applied to the control volume method, as it is.

When the discretization using control volumes is carried out, each of differential operators $\partial/\partial x$, $\partial/\partial y$ and $\partial/\partial z$ indicates the divergence or gradient of an operand, depending upon whether the equation of continuity or the Navier-Stokes' equation is used as the inputted partial differential equator, or whether the advection term or the diffusion term has the differential operator, and it is required to process the differential operator in accordance with the actual function thereof.

That is, it is a problem of the control volume method that the discretization has to be carried out in a favorable manner in accordance with the partial differential equation used and the partial differential operator included therein. Further, it is another problem of the control volume method how boundary conditions are treated in discretizing the partial differential equation.

SUMMARY OF THE INVENTION

It is accordingly an object of the present invention to provide a method of automatically producing a numerical calculation program by carrying out discretization according to the control volume method.

It is another object of the present invention to provide a method of producing a numerical calculation program in such a manner that a differential operator which is to be discretized by the control volume method, is automatically selected from a partial differential equation and the selected differential operator is discretized by the control volume method.

In order to attain the above objects, according to the present invention, there is provided a method of automatically producing a numerical calculation program capable of calculating, in a specified analytic domain, the value of a physical quantity defined by a partial differential equation which method comprises a step of judging whether or not each of the terms which are included in the partial differential equation and have a differential operator, is to be discretized on the basis of the divergence of an operand at a control volume, depending upon which of predetermined conditions is satisfied, and another step of carrying out the discretization based upon the divergence of the operand for a term when it is judged that the term is to be discretized on the basis of the divergence of the operand.

BRIEF DESCRIPTION OF THE DRAWINGS

FIG. 5A shows an example of the numerical calculation program produced by the method of FIG. 2.

FIG. 7 is a flow chart showing the discretization processing 111 which is based upon the divergence of an operand and shown in FIG. 6.

FIG. 8A is a table showing the meanings of special differential operators used in the discretization processing of FIG. 7.

FIG. 8B shows the meanings of other differential operators.

FIG. 10 shows discretization rules used in the method of FIG. 2.

FIG. 12 shows an example of an equation group obtained by the discretization processing for a discrete point on the boundary line of an analytic domain.

FIG. 15 shows the result of discretization carried out for the partial differential equation which is defined by the input information of FIG. 3.

FIG. 16 shows the result of a grouping operation performed for the equation of FIG. 15.

DESCRIPTION OF THE PREFERRED EMBODIMENT

Figure 2:
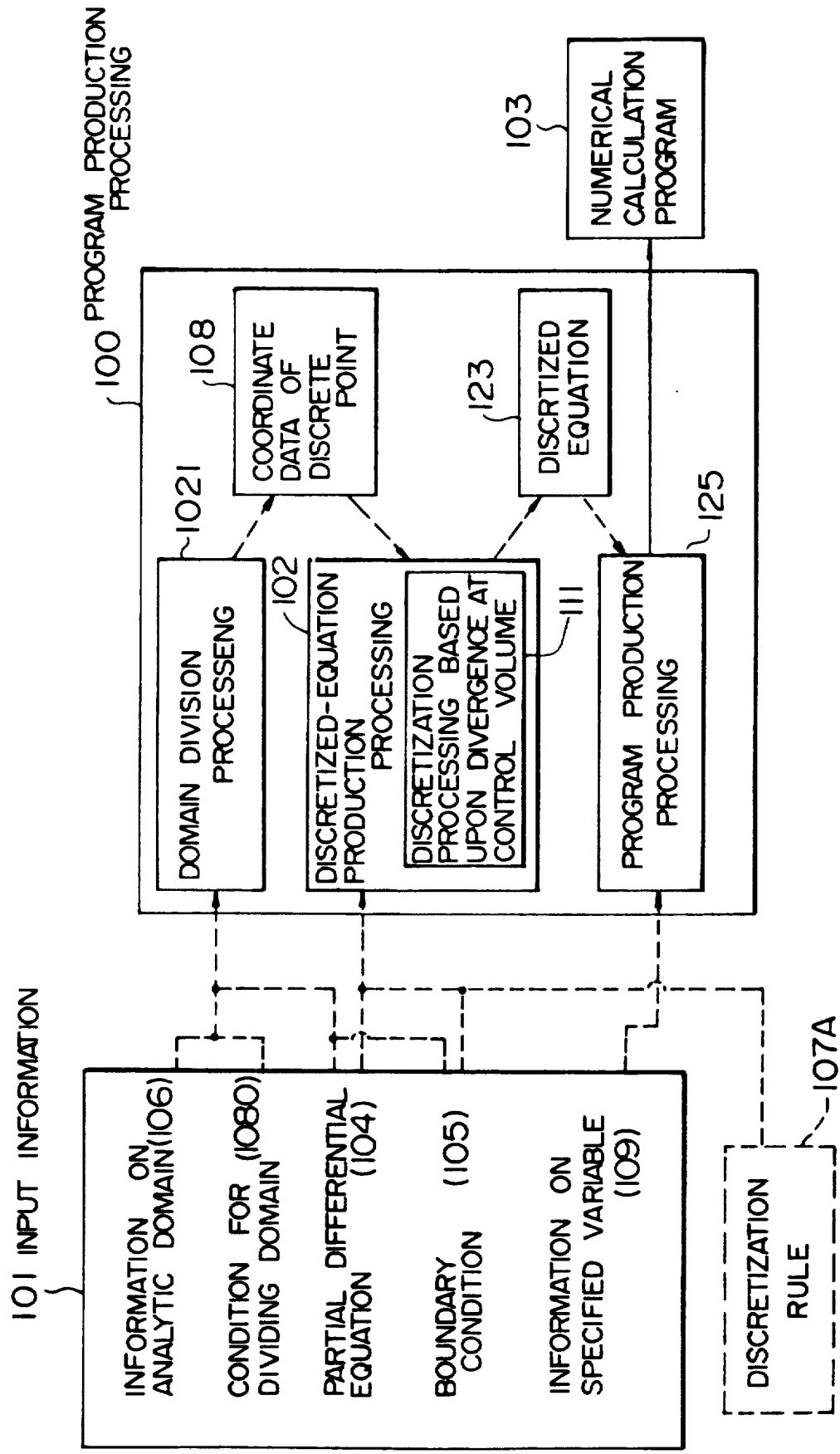
FIG. 2 is a flow chart showing an embodiment of a method of producing a numerical calculation program in accordance with the present invention.

FIG. 2 shows the processing 100 carried out in an embodiment of a method of producing a numerical calculation program in accordance with the present invention. The processing 100 is carried out by a computer, and can automatically produce a numerical propagation program 103 from input information 101. In more detail, domain division processing 1021 is first carried out on the basis of input information 106 on an analytic domain and inputted conditions 1080 for dividing the analytic domain, to divide the analytic domain into a plurality of rectangular meshes and to determine the coordinate data of each of the vertices of the meshes (that is, the coordinate data 108 of each discrete point). Then, discretized-equation production processing 102 is carried out by using the coordinate data 108, an inputted partial differential equation 104 and inputted boundary conditions 105, to produce discretized equations 123. Further, program production processing 125 is carried out by using the discretized equations 123 and input information 109 on a specified variable, to produce a numerical calculation program 103 for solving the partial differential equation 104 for the specified variable. The characteristic feature of the present embodiment resides in that the discretization processing 111 based upon the divergence of an operand at a control volume is included in the discretized-equation production processing 102. Usually, it is not required that a user inputs discretization rules 107A to the computer. However, the operator may input the discretization rules 107A.

Figures 3, 4:
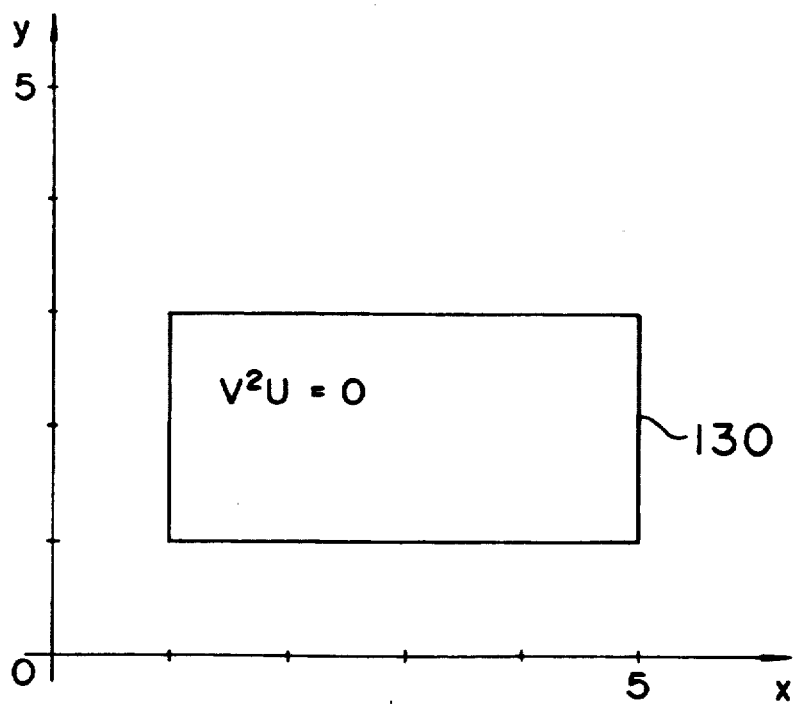
FIG. 3 shows an example of input information used in the method of FIG. 2.
FIG. 4 is a graph which shows the analytic domain specified by the input information of FIG. 3.

FIG. 3 shows an example of input information 101 used in the processing 100 of FIG. 2, that is, shows an example of input information for solving a partial differential equation in the two-dimensional rectangular analytic domain 130 of FIG. 4. Referring to FIG. 3, the conditions 1080 for dividing the domain indicate how the analytic doamin 130 is to be divided. In the present example, the analytic domain 130 is divided at an interval of a unit length (namely, a length of "1") in each of X- and Y-directions. The input information 106 on the analytic domain specifies the position and size of the analytic domain 130. In the present example, the input information 106 indicates that the analytic domain is extended between X-coordinate values "1" and "5" and between Y-coordinate values "1" and "3". The inputted boundary conditions 105 include the REGION-statement indicative of boundary portions and the BCOND-statement indicative of the boundary conditions at the boundary portions. In the present example, the left side of the analytic domain 130 is indicated by a code "LEFT" in the REGION-statement, and it is indicated in the BCOND-statement that an equation DX(u)=0 (namely, ∂u/∂x=0) holds for the left side of the analytic domain 130. Further, the right, top and bottom sides of the domain 130 are indicated in the REGION-statement by codes "RIGHT", "UP" and "DOWN", respectively, and it is indicated in the BCOND-statement that the variable u is equal to 1 at the right and bottom sides, and is equal to α at the top side. The input information 104 on the partial differential equation indicates that an equation LAPL(u)=α is to be solved, and the input information 109 on a specified variable indicates that the above equation is to be solved for a variable u. It is to be noted that the equation LAPU(u)=0 is identical with $$\frac{\partial^2 u}{\partial x^2} + \frac{\partial^2 u}{\partial y^2} = \alpha.$$

FIG. 5A shows an example of a numerical calculation program which is produced on the basis of the input information 101 of FIG. 3 and is written in the FORTRAN language.

Figure 1:
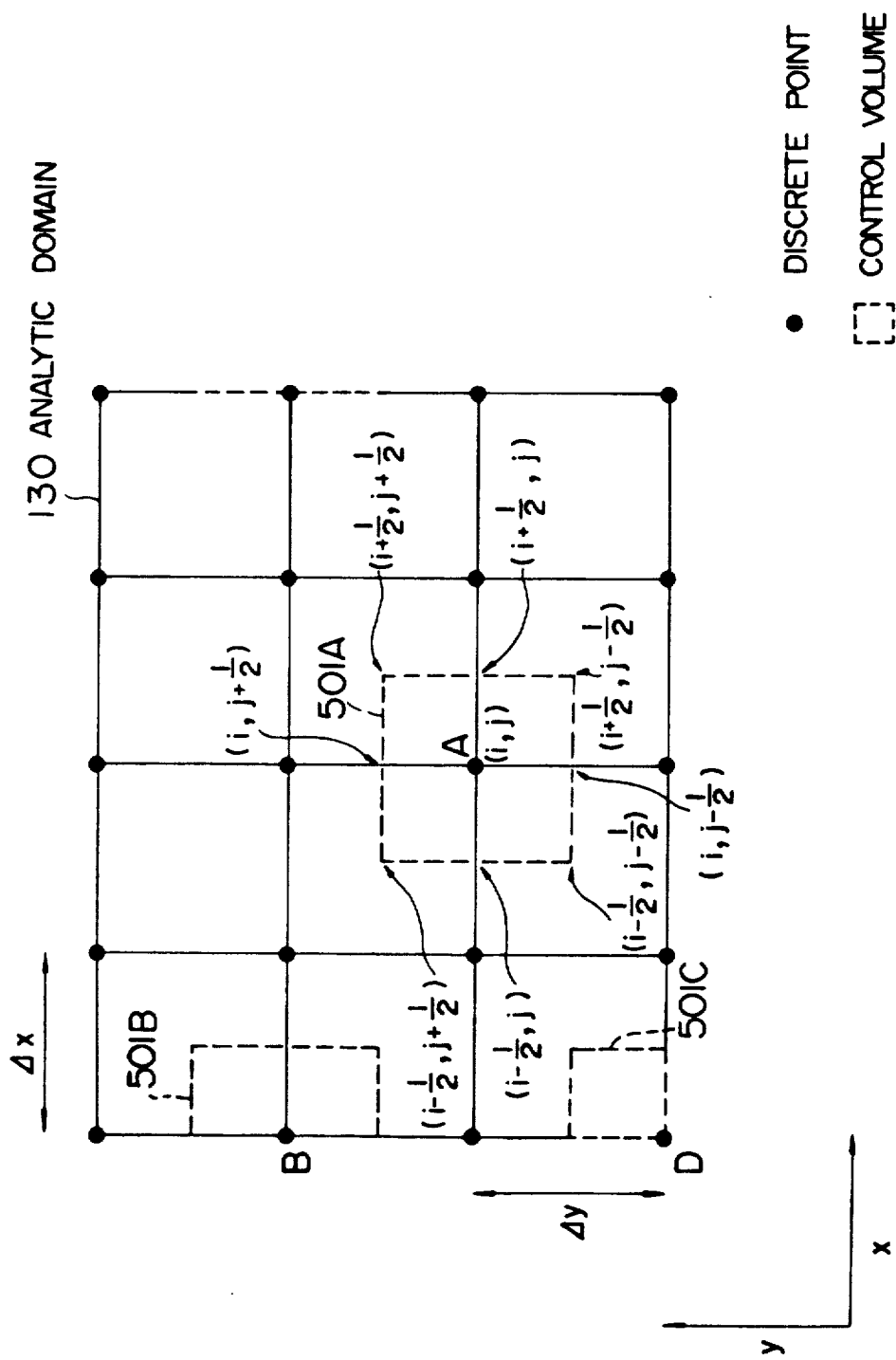
FIG. 1 is a schematic diagram for explaining a control volume.

Prior to providing a detailed explanation of the program production processing 100 of FIG. 2, the discretization according to the control volume method will be explained below, with reference to FIG. 1. According to the control volume method, the whole of an analytic domain is divided into a plurality of control volumes so that each control volume contains one discrete point (namely, one vertex of a mesh), and adjacent control volumes do not overlap each other. Referring to FIG. 1, a control volume 501A having top and bottom sides equal to Δx and having left and right sides equal to Δy is formed so that an inner discrete point A is contained in the control volume 501A. For a discrete point B on the boundary line of the analytic domain 130, a control volume 501B whose area is one half the area of the control volume 501A, is formed so that the left side of the control volume 501B is placed on the above boundary line. Further, for a discrete point C at a corner of the analytic domain 130, a control volume 501C whose area is one-fourth the area of the control volume 501A, is formed so that the left and bottom sides of the control volume 501C are placed on the boundary line of the analytic domain 130. Although control volumes can be formed for the remaining discrete points in a similar manner, an explanation of these control volumes will be omitted for brevity's sake. As can be seen from the above explanation, the sum of the control volumes for all the discrete points agrees with the analytic domain 130.

Now, an explanation of the discretization of the input equation LAPL(u)=0 of FIG. 3, for the inner discrete point A, will be provided.

The equation LAPL(u)=α can be rewritten as follows:

$$\frac{\partial^2 u}{\partial x^2} + \frac{\partial^2 u}{\partial y^2} = \alpha \tag{1}$$

By integrating the equation (1) in the control volume 501A, we can obtain the following equation:

$$\int_{cv} \left( \frac{\partial^2 u}{\partial x^2} + \frac{\partial^2 u}{\partial y^2} \right) dxdy = \int_{cv} \alpha \, dxdy \tag{2}$$

Further, the equation (1) can be rewritten as follows:

$$\text{div}(\text{grad } u) = \alpha \tag{1'}$$

Hence, the equation (2) can be rewritten as follows:

$$\int_{cv} \text{div}(\text{grad } u) \, dxdy = \int_{cv} \alpha \, dxdy \tag{2'}$$

As is well known, Gauss' theorem can be written as follows:

$$\int_{cv} \text{div}(\text{grad } u) \, dxdy = \int_{L} \text{grad}(u) \, dl \tag{3}$$

The right-hand side of the equation (3) indicates the line integral along the boundary line of the control volume 501A. Hence, from the equations (2') and (3), we can obtain the following equation:

$$\int_{L} \text{grad}(u) \, dl = \alpha \Delta x \Delta y \tag{4}$$

By carrying out the line integral of the left-hand side of the equation (4), we can obtain the following equation:

$$\frac{\left(\frac{\partial u}{\partial x}\right)_{i+\frac{1}{2},j} - \left(\frac{\partial u}{\partial x}\right)_{i-\frac{1}{2},j}}{\Delta x} + \frac{\left(\frac{\partial u}{\partial y}\right)_{i,j+\frac{1}{2}} - \left(\frac{\partial u}{\partial y}\right)_{i,j-\frac{1}{2}}}{\Delta y} = \alpha \tag{5}$$

Thus, each second derivative included in the original differential equation is converted into a discretized equation including a first derivative. In other words, the equation (5) is the result of discretization based upon the integration by parts at the control volume 501A.

Since the equation (5) still includes a partial differential operator, the partial differential operator is discretized by using the Taylor expansion. In other words, a partial derivative $$\left(\frac{\partial u}{\partial x}\right)_{l,m}$$

is expressed by the following central finite difference equation:

$$\left(\frac{\partial u}{\partial x}\right)_{l,m} = U_{l+\frac{1}{2},m} - U_{l-\frac{1}{2},m} \tag{6}$$

where each of the characters l and m is a suffix for indicating a position in the analytic domain. It is to be noted that the equation (6) is the central finite difference equation for the partial differential operator with respect to x and a central finite difference equation similar to the equation (6) can be formed for the partial differential operator with respect to y. Further, there are known the following approximate equations:

$$U_{l+\frac{1}{2},m} = \frac{U_{l,m} + U_{l+1,m}}{2}, \; U_{l-\frac{1}{2},m} = \frac{U_{l-1,m} + U_{l,m}}{2} \tag{7}$$

From the equations (5), (6) and (7), we can obtain the following equation:

$$\frac{U_{i+1,j} - 2U_{i,j} + U_{i-1,j}}{\Delta x^2} + \frac{U_{i,j+1} - 2U_{i,j} + U_{i,j-1}}{\Delta y^2} = \alpha \tag{8}$$

It is to be noted that the equation (8) is the final discretized equation of the equation (1) for the inner discrete point A.

As can be seen from the above explanation, the outer differential operators $$\frac{\partial}{\partial x} \text{ and } \frac{\partial}{\partial y}$$

of the partial differential operators of the second order (that is, $$\frac{\partial^2 u}{\partial x^2} \text{ and } \frac{\partial^2 u}{\partial y^2} \text{ )}$$

are eliminated or discretized by using the integration by parts at the control volume, to obtain an intermediate discretized equation. Further, the differential operators $$\frac{\partial u}{\partial x} \text{ and } \frac{\partial u}{\partial y}$$

included in the intermediate discretized equation are eliminated or discretized by using a central finite difference equation, to obtain the final discretized equation.

In general, partial differential operators used in a partial differential equation include an operator indicating the divergence of an operand and an operator indicating the gradient of the operand. In the equation (1), the outer differential operator of each second derivative indicates the divergence, and the inner differential operator indicates the gradient. As mentioned above, the differential operator indicative of the divergence is discretized by the integration by parts at a control volume, and the differential operator indicative of the gradient is discretized by using a central finite difference equation based upon the Taylor expansion. Accordingly, it is necessary to judge which of the divergence and gradient of an operand is indicated by a differential operator included in an inputted partial differential equation, and to discretize the differential operator in a favorable manner.

A partical differential equation has a physical meaning. For example, the equation of continuity and the Navier-Stokes' equation are used for expressing the property and motion of fluid. In some cases, these equations are expressed by using a differential operator "div" or "grad". In other cases, the equations are expressed by using the differential operators $\partial/\partial x$, $\partial/\partial y$ and $\partial/\partial z$. The differential operators "div" and "grad" indicate the divergence and gradient of an operand, respectively. The operator "div" is discretized by using the integration by parts, and the operator "grad" is not discretized in the above manner. That is, the operators "div" and "grad" are discretized in different fashions. Accordingly, it is necessary to judge which of the divergence and gradient is indicated by the operators $\partial/\partial x$, $\partial/\partial y$ and $\partial/\partial z$. In general, the function (divergence or gradient) of the operators $\partial/\partial x$, $\partial/\partial y$ and $\partial/\partial z$ is determined from the physical meaning of the partial differential equation or the term having the operators. In the present embodiment, however, it is judged on the basis of predetermined criteria as to which of the divergence and gradient is indicated by the operators $\partial/\partial x$, $\partial/\partial y$ and $\partial/\partial z$. The criteria will be explained later in detail.

The discretization of the equation (1) for a discrete point on the boundary line is carried out in the following manner.

For the control volume 501B including the discrete point B, we can obtain the following equation by using the integration by parts, in place of the equation (5):

$$\frac{\left(\frac{\partial u}{\partial x}\right)_{i+1,j} - \left(\frac{\partial u}{\partial x}\right)_{i,j}}{\Delta x} + \tag{5'}$$

-continued $$\frac{\left(\frac{\partial u}{\partial y}\right)_{i,j+\frac{1}{2}} - \left(\frac{\partial u}{\partial y}\right)_{i,j}}{\Delta y} = \alpha$$

The input information 105 of FIG. 3 on boundary conditions indicates that the term $$\left(\frac{\partial u}{\partial x}\right)_{i,j}$$

in the equation (5') is equal to $\beta$.

By substituting $\beta$ for the term $$\left(\frac{\partial u}{\partial x}\right)_{i,j},$$

we can obtain the following equation:

$$\frac{\left(\frac{\partial u}{\partial x}\right)_{i+1,j} - \beta}{\Delta x} + \frac{\left(\frac{\partial u}{\partial y}\right)_{i,j+1} - \left(\frac{\partial y}{\partial y}\right)_{i,j}}{\Delta y} = \alpha \tag{5''}$$

The equation (5'') is the result of discretization using the integration by parts at the control volume 501B. Differential operators $$\frac{\partial}{\partial x} \text{ and } \frac{\partial}{\partial y}$$

are included in the equation (5''). By using the equations (6) and (7), we can rewrite the equation (5'') as follows:

$$\frac{U_{i+1,j} - U_{i,j}}{\Delta x^2} - \frac{\beta}{\Delta x} + \frac{U_{i,j+1} - 2U_{i,j} + U_{i,j-1}}{\Delta y^2} = \alpha \tag{7'}$$

The equation (7') is the final discretized equation for the discrete point B.

As can be seen from the above explanation, the discretization for a discrete point on the boundary line is different from the discretization for an inner discrete point, in that a boundary condition is inserted into an intermediate discretized equation which is obtained by using the integration by parts at a control volume, and then a differential operator included in the intermediate discretized equation is discretized by using a central finite difference equation based upon the Taylor expansion. It is to be noted that the integration by parts at a control volume will not be carried out in examples mentioned below, but the result of the integration by parts is previously stored in the form of a discretization rule (shown in FIG. 10), to be utilized in the examples.

Figure 6:
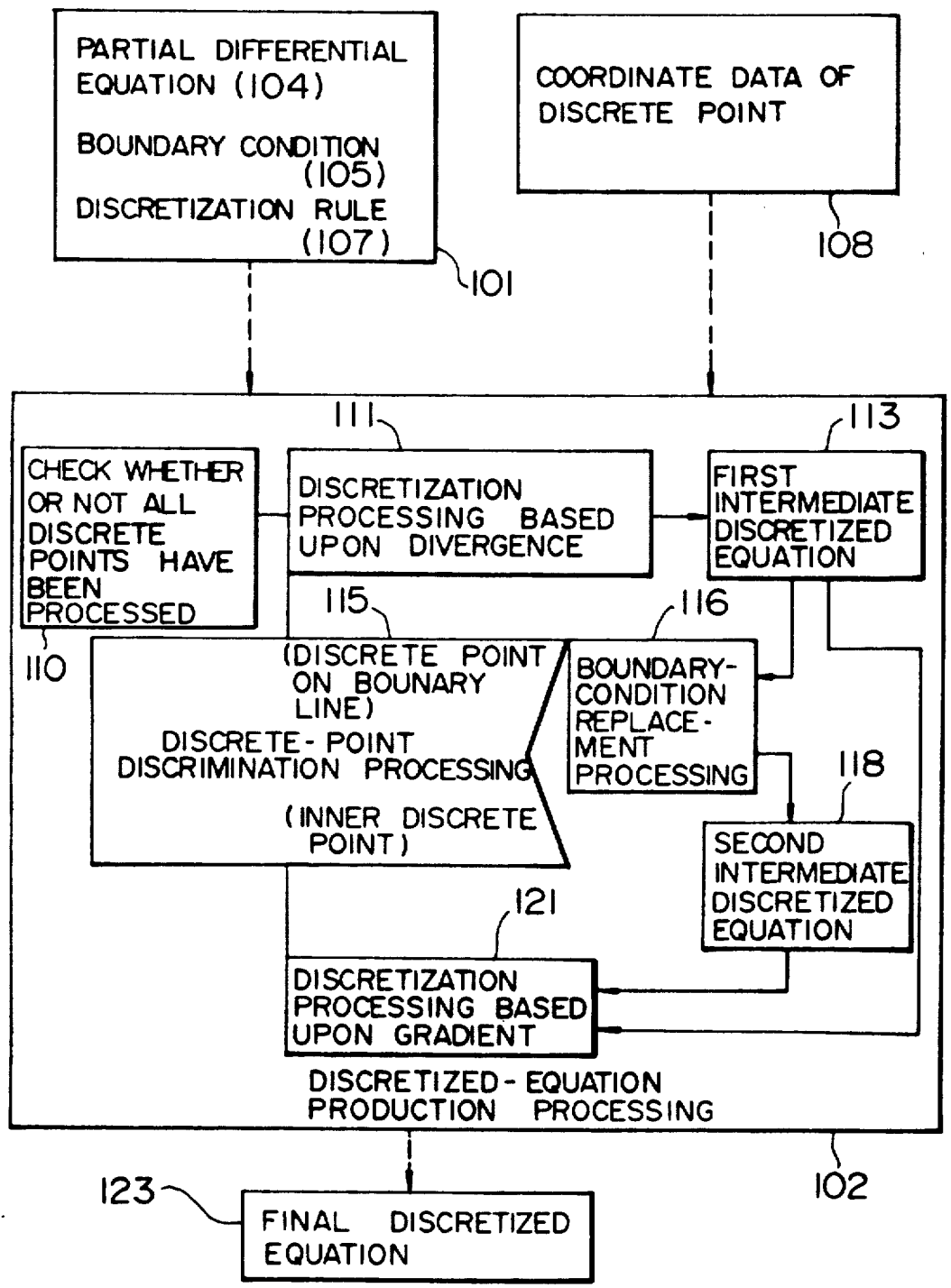
FIG. 6 is a flow chart showing the discretized equation production processing 102 of FIG. 2.

Now, the program production processing 100 of FIG. 2 will be explained below in detail. Referring to FIG. 2, the domain division processing 1021 is the same as conventional domain division processing, and hence explanation of the processing 1021 will be omitted. In the discretized-equation production processing 102, as shown in FIG. 6, the discretization processing 111 based upon divergence is first carried out on the basis of the coordinate data 108 of discrete points obtained by the domain division processing 1021, the input information 104 on the partial differential equation, and input information 105 on the boundary conditions. The discretization processing 111 is carried out for all the discrete points (step 110). Further, the discretization processing 111, as shown in FIG. 7, includes a step 1001 of automatically extracting a differential operator indicating the divergence of an operand from the inputted partial differential equation.

FIGS. 8A and 8B are tables which are used for extracting the differential operator indicative of divergence. Referring to FIG. 8A, differential operators "div", "grad", and "rot" indicate physical properties, and it is judged that the operator "div" in a partial differential equation indicates the divergence of an operand, and the operators "grad" and "rot" indicate the gradient of the operand. The differential operators $$\frac{\partial}{\partial x}, \frac{\partial}{\partial y} \text{ and } \frac{\partial}{\partial z}$$

in an equation are judged in accordance with the table of FIG. 8B. The differential operators $$\frac{\partial}{\partial x}, \frac{\partial}{\partial y} \text{ and } \frac{\partial}{\partial z}$$

in an equation indicating a boundary condition always form a first derivative. That is, each of these operators appears in the form of, for example, $$\frac{\partial u}{\partial x} = \alpha.$$

This equation indicates the gradient of the variable u at the boundary. Accordingly, the operators $$\frac{\partial}{\partial x}, \frac{\partial}{\partial y} \text{ and } \frac{\partial}{\partial z}$$

in an equation indicating a boundary condition are defined as an operator indicative of gradient. The general form of a partial differential equation of the second order is given as follows:

$$div(k \cdot grad(u) + V \cdot u) = \alpha \quad (9)$$

Further, a partial differential equation of the second order can also be written as follows:

$$\partial(k \cdot (\partial u/\partial x) + u)/\partial x = \alpha$$
or
$$\partial^2 u/\partial x^2 + V \cdot \partial u/\partial x = \alpha$$

A partial differential operator in these partial differential equations is defined as follows. The inner differential operator $$\frac{\partial}{\partial x}$$

of a second derivative is defined as an operator indicative of gradient, the outer differential operator $$\frac{\partial}{\partial x}$$

of the second derivative is defined as an operator indicative of divergence, and the differential operator $$\frac{\partial}{\partial x}$$

of a first derivative is defined as an operator indicative of divergence. Although only the differential operator with respect to x has been explained in the above, differential operators with respect to y and z, that is, $$\frac{\partial}{\partial y} \text{ and } \frac{\partial}{\partial z}$$

can be defined in the same manner as mentioned above. Incidentally, an operator $\nabla$ indicates Laplacian, that is, $\nabla$ is equal to, for example, $$\frac{\partial^2}{\partial x^2}.$$

Further, the general form of a partial differential equation of the first order is given as follows:

$$div(u) = \alpha$$

This equation may be given in the form of $$\frac{\partial u}{\partial x} + \frac{\partial u}{\partial y} = \alpha.$$

Accordingly, the differential operators $$\frac{\partial}{\partial x} \text{ and } \frac{\partial}{\partial y}$$

and in the latter equation are defined as an operator indicative of divergence.

By using the discrimination rules of FIGS. 8A and 8B, it is possible to automatically judge which of divergence and gradient is indicated by a differential operator.

Now, explanation will be made of the discretization of a partial differential equation 104 of FIG. 9 for an inner discrete point. The term $\nabla^2 u$ in the equation 104 indicates $$\frac{\partial}{\partial x}\left(\frac{\partial u}{x}\right).$$

Figure 11:
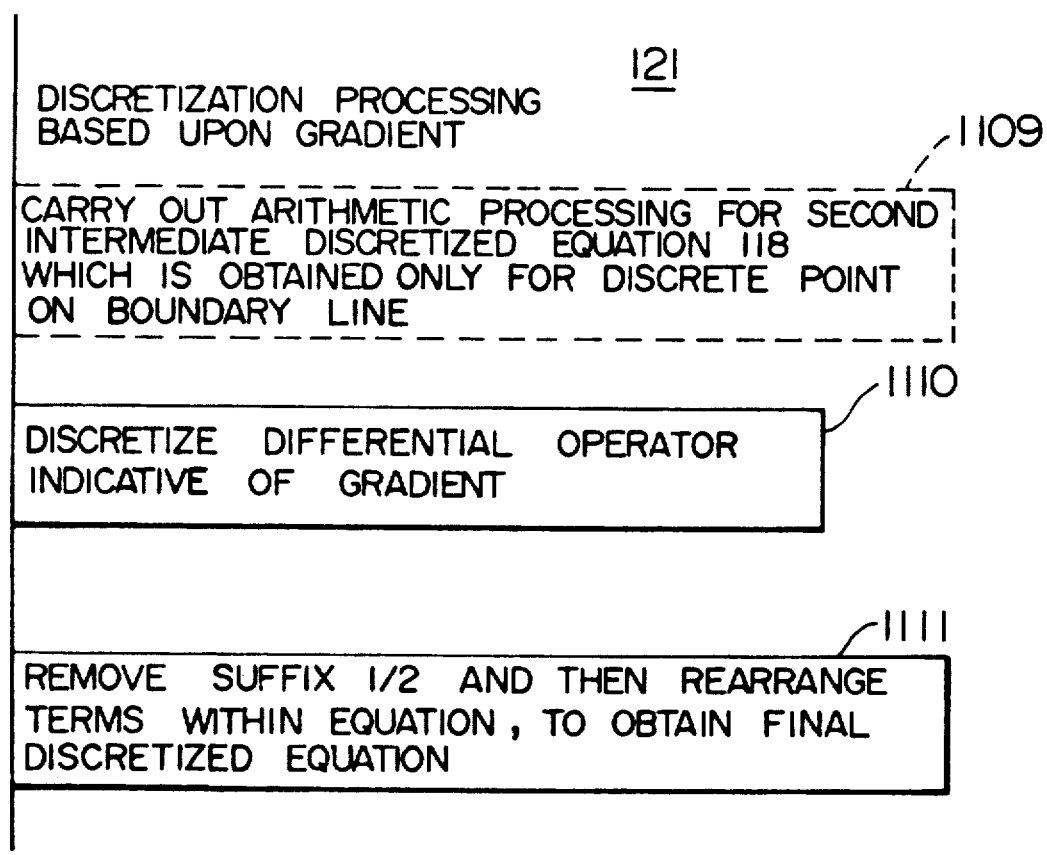
FIG. 11 is a flow chart showing the discretization processing 121 which is based upon the gradient of an operand and shown in FIG. 6.

In the step 1001 of FIG. 7, the outer differential operator $$\frac{\partial}{\partial x}$$

of the term $$\frac{\partial}{\partial x}\left(\frac{\partial u}{\partial x}\right)$$

is judged to be an operator indicative of divergence. Further, since the second term $$k \frac{\partial u}{\partial x}$$

is the first derivative included in the partial differential equation of the second order, the differential operator $$\frac{\partial}{\partial x}$$

of the second term $$k \frac{\partial u}{\partial x}$$

is judged to be an operator indicative of divergence. In order to discriminate these differential operators from an operator indicative of gradient, a mark $\yen$ is given to each of these differential operators. Thus, an equation 1002 shown in FIG. 9 is obtained. In the step 1003 of FIG. 7, only the differential operators having the mark $\yen$ are discretized. In the present embodiment, an integration by parts is not carried out for a differential operator indicative of divergence, but the results 930 and 940 of integration by parts shown in FIG. 10 are previously stored, as discretization rules, in a memory. That is, for an inner discrete point, the differential operator $$\frac{\partial}{\partial x}$$

is discretized by the equation 930. The differential operator $$\frac{\partial}{\partial y}$$

can be discretized by a similar equation. For a discrete point on the boundary line, the differential operator $$\frac{\partial}{\partial x}$$

is dicretized by the equation 940. It is to be noted that the equation 940 holds for the discrete point on the left side of a leftmost control volume, and similar equations for discrete points on respective right, top and bottom sides of rightmost, uppermost and lowermost control volumes are also stored in the memory. In the step 1003 of FIG. 7, the discretization rule 930 of FIG. 10 is applied to the equation 1002 of FIG. 9, to obtain an equation 113A which is the first intermediate discretized equation 113. Thus, the discretization with respect to divergence is completed. The discretization rule for a differential operator indicative of gradient is also shown in FIG. 10. For an inner discrete point, the first intermediate discretized equation is further discretized by using the central difference equation 931 based upon the Taylor expansion. Further, for a discrete point on the boundary line, a differential operator $$\frac{\partial u}{\partial y}$$

indicative of gradient is not discretized, but is replaced by a boundary condition. In a case where such a boundary condition is absent, an alarm is generated, and the processing is stopped. When the discretization processing 111 based upon divergence is completed, the discrete-point discrimination processing 115 of FIG. 6 is carried out. When the discrete point which is now being processed, is judged to be an inner discrete point, the boundary-condition replacement processing 116 is omitted, and the discretization processing 122 based upon gradient is carried out. The processing 122 includes three steps 1109, 1110 and 1111, as shown in FIG. 11. For an inner discrete point, however, only the processing in the steps 1110 and 1111 is carried out. That is, a differential operator which is included in the first intermediate discretized equation 113 and indicates the gradient of an operand, is discretized (step 1110). Since all of the differential operators included in the first intermediate discretized equation 113A of FIG. 9 indicate the gradient of an operand, these differential operators are discretized by the discretization rule 931 of FIG. 10. Thus, an equation 1005 shown in FIG. 9 is obtained. Next, a suffix $\frac{1}{2}$ in the equation 1005 is removed, and then terms in the equation 1005 are rearranged (step 1111). In more detail, the value of variable u at a middle point $(i \pm \frac{1}{2}, j)$ between adjacent discrete points is converted into the value of the variable u at a discrete point by using the following equations:

$$U_{i+\frac{1}{2},j} = \frac{U_{i,j} + U_{i+1,j}}{2}, \quad U_{i-\frac{1}{2},j} = \frac{U_{i-1,j} + U_{i,j}}{2}. \quad (10)$$

Figure 9:
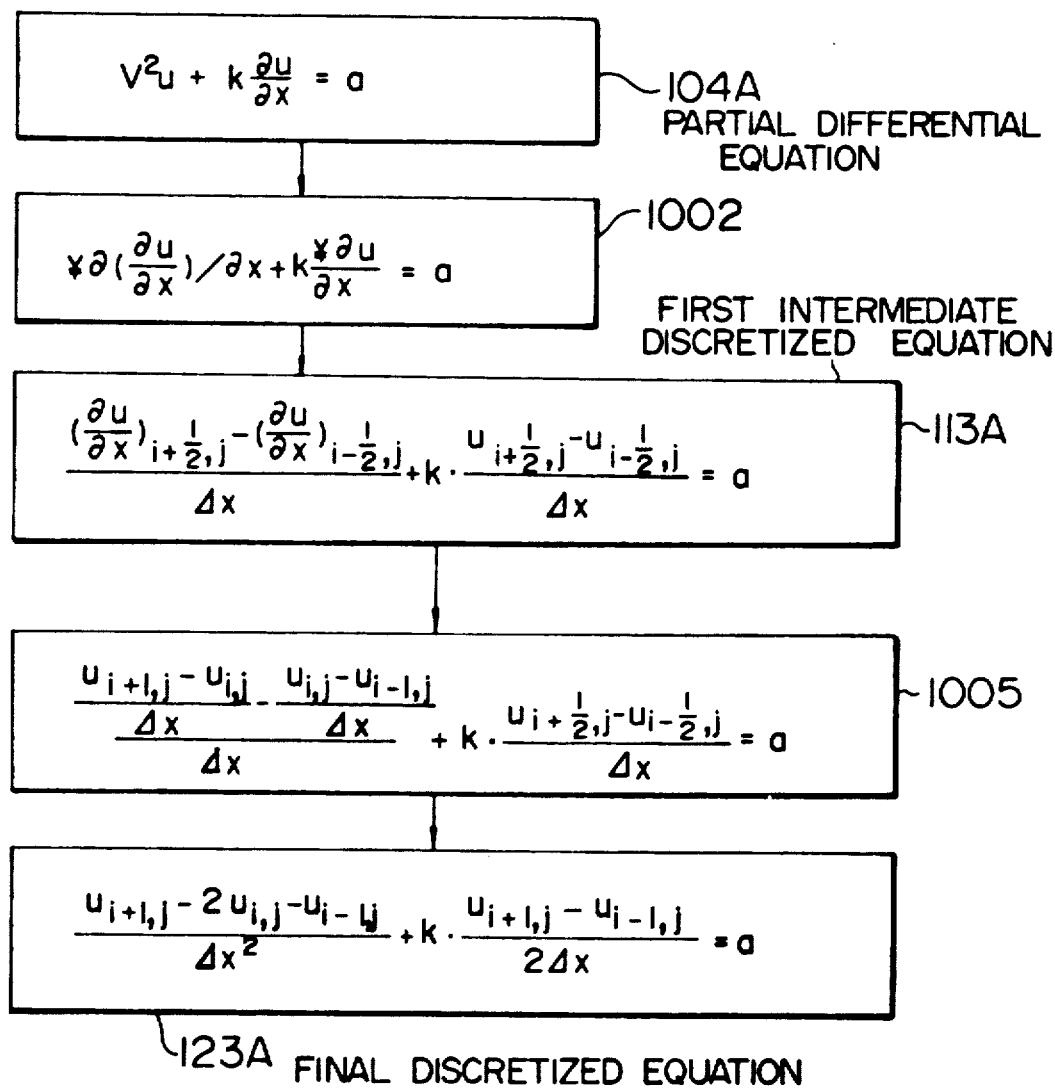
FIG. 9 shows an equation group obtained in the course of the discretization processing for a discrete point within an analytic domain.

Thus, we can obtain an equation 123A which is the final discretized equation 123, as shown in FIG. 9. The discretized-equation production processing 102 for an inner discrete point is carried out in the above-mentioned manner.

Figure 13:
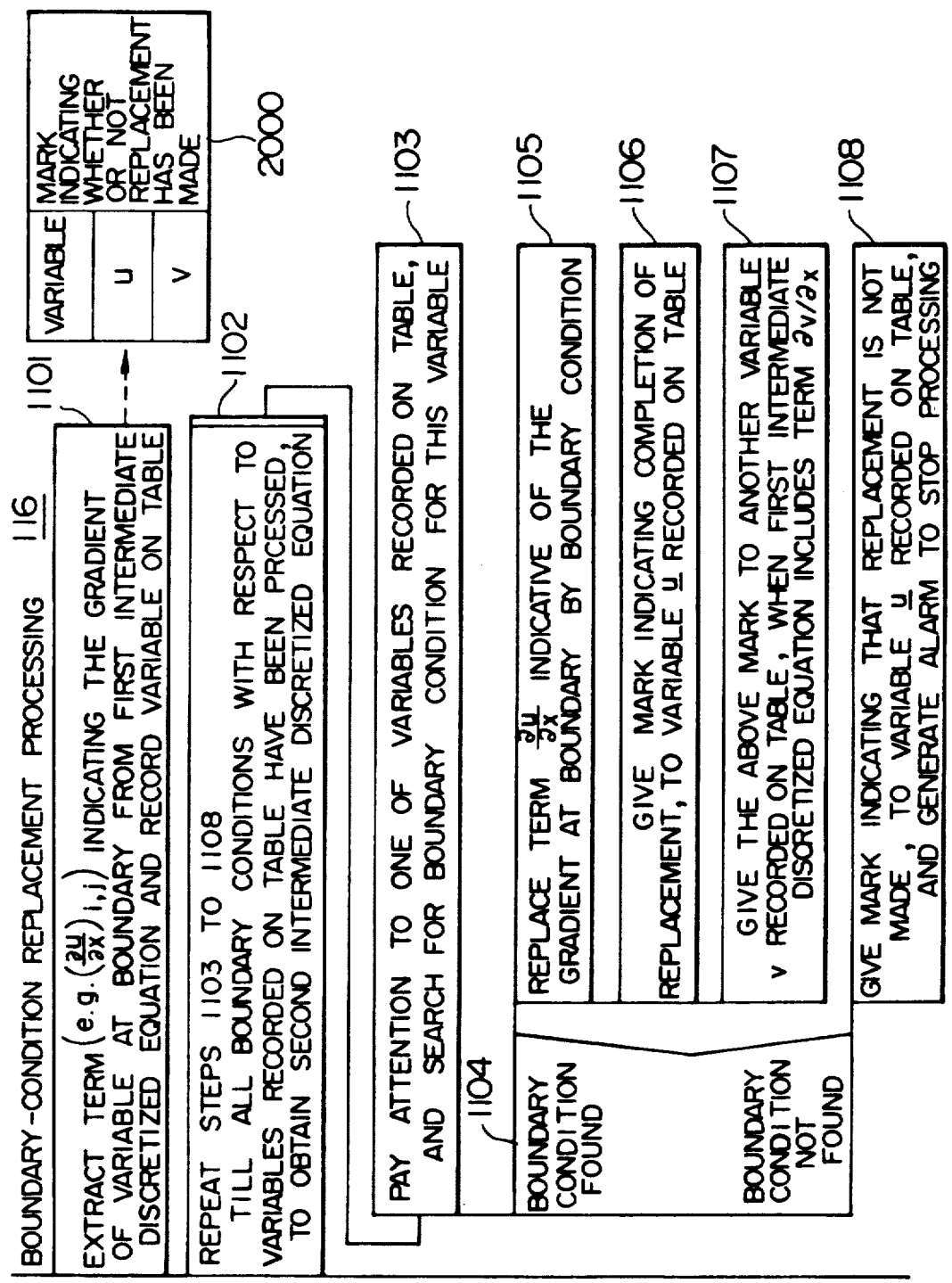
FIG. 13 is a flow chart showing the boundary-condition replacement processing 116 of FIG. 6.

Next, explanation will be made of the discretized-equation production processing 102 for a discrete point on the boundary line. The following explanation will be made of the processing 102 for a discrete point on the left side of a leftmost rectangular control volume in a case where the input information 101 of FIG. 2 includes a partial differential equation 104B and a boundary condition 105B shown in FIG. 12, by way of example. Like the processing 102 for an inner discrete point, the discretization processing 111 based upon divergence is first carried out. Referring to FIG. 7, a differential operator indicating the divergence of an operand is extracted from the partial differential equation 104B, and the mark $\yen$ is given to the extracted differential operator (step 1001). Thus, an equation 1002B shown in FIG. 12 is obtained. Next, those terms of the equation 1002B which have the differential operator indicative of divergence, are discretized (step 1003). Thus, an equation 113B is obtained which is the first intermediate discretized equation. Thus, the discretization processing based upon divergence is completed. Then, the discrete-point discrimination processing 115 of FIG. 6 is carried out. Thus, the discrete point which is now being processed, is judged to be a discrete point on the boundary line, and then the boundary-condition replacement processing 116 is carried out. Details of the processing 116 will be explained below, with reference to FIG. 13. First, a term $$\left( \frac{\partial u}{\partial x} \right)_{i,j}$$

indicating the gradient of the variable u at the boundary is extracted from the first intermediate discretized equation 113B (where i and j indicate the X- and Y-coordinate values of the discrete point on the boundary line), and the variable u is recorded on a table 2000 (step 1101). The table 2000 is used for recording a variable whose gradient at the boundary is included in the first intermediate discretized equation 113. For example, when a gradient $$\frac{\partial u}{\partial x}$$

at the boundary is included in the equation 113, the variable u is recorded on the table 2000. Variables whose gradient at the boundary appears in the first intermediate discretized equation 113, are all recorded on the table 2000. In a case where the gradient of a variable at the boundary appears in the equation 113 a plurality of times, however, the variable is only once recorded on the table 2000. For the equation 113B of FIG. 12, variables u and v are recorded on the table 2000. Then, the processing in steps 1103 to 1108 is repeated till boundary conditions with respect to all the variables recorded on the table 2000 have been processed, to produce the second intermediate discretized equation (step 1102). In the steps 1103 to 1108, the gradient of a variable which is recorded on the table 2000, at the boundary is replaced by a boundary condition. In more detail, attention is paid to one of variables recorded on the table 2000, for example, a variable u, and the input information 101 is searched for the boundary condition with respect to the gradient $\partial u/\partial x$ at the boundary. In the case shown in FIG. 12, an equation 105B showing the boundary condition is searched for. It is checked in step 1104 whether the above boundary condition is present or not. When the boundary condition is found, a term $$\frac{\partial u}{\partial x}$$

indicative of the gradient at the boundary is replaced by the boundary condition (step 1105). In the case shown in FIG. 12, the term $$\left(\frac{\partial u}{\partial x}\right)_{i,j}$$

in the equation 113B is rewritten by using the equation 105B indicative of a boundary condition. Thus, an equation 118A is obtained which is the second intermediate discretized equation 118. After the step 1105, a mark for indicating that the replacement using a boundary condition has been completed, is given to the variable u recorded on the table 2000 (step 1106). In a case where a plurality of terms each having the form of (grad u)$_{i,j}$ are included in the first intermediate discretized equation, all of the terms are replaced by boundary conditions. Further, in a case where an equation indicating a boundary condition with respect to a variable (for example, u) includes the gradient of another variable which is recorded on the table 2000, at the boundary, the mark for indicating that replacement has been completed, is also given to the another variable on the table 2000 (step 1107). In the case shown in FIG. 12, the equation 105B indicating a boundary condition includes a term $$\frac{\partial v}{\partial x} \cdot$$

and hence the above mark is given to the variable v on the table 2000. When it is judged in step 1104 that a boundary condition for a desired variable is absent, a mark for indicating that the replacement using a boundary condition is not carried out, is given to the above variable on the table 2000 (step 1108). In a case where a variable with the mark for indicating that the replacement is not carried out, is present on the table 2000, it is judged that the input information 101 is deficient in boundary condition. Thus, an alarm is generated, and the partial derivative of the above variable is replaced by an approximate equation according to the Taylor expansion. When the processing in the steps 1102 to 1108 has been carried out, the boundary-condition replacement processing 116 terminates.

When the processing 116 has terminated, the discretization processing 121 based upon gradient is carried out in the same manner as made for an inner discrete point. The discretization processing 121 will be explained below in detail, with reference to FIG. 11. In step 1109, arithmetic processing is carried out for the second intermediate discretized equation 118 of FIG. 6. That is, terms in the equation 118 cancel each other, if possible. In the case shown in FIG. 12, arithmetic processing is carried out for the equation 118A, to obtain an equation 1005. In step 1110, a term having the differential operator indicative of the gradient of an operand is discretized in the same manner as made for an inner discrete point. Then, a suffix ½ is removed from the second intermediate discretized equation having been subjected to the arithmetic processing, and then a grouping operation is performed for the above equation to obtain the final discretized equation (step 1111). In the case shown in FIG. 12, an equation 123B is obtained as the final discretized equation. Similarly to the suffix removing processing for an inner discrete point, the suffix ½ is removed by using the equations (10). The discretized-equation production processing 102 for a discrete point on the boundary line is carried out in the above-mentioned manner.

When the discretized-equation production processing 102 for inner discrete points and discrete points on the boundary line has been completed, the program production processing 125 of FIG. 2 is carried out, to produce the numerical calculation program 103.

Figure 5B:
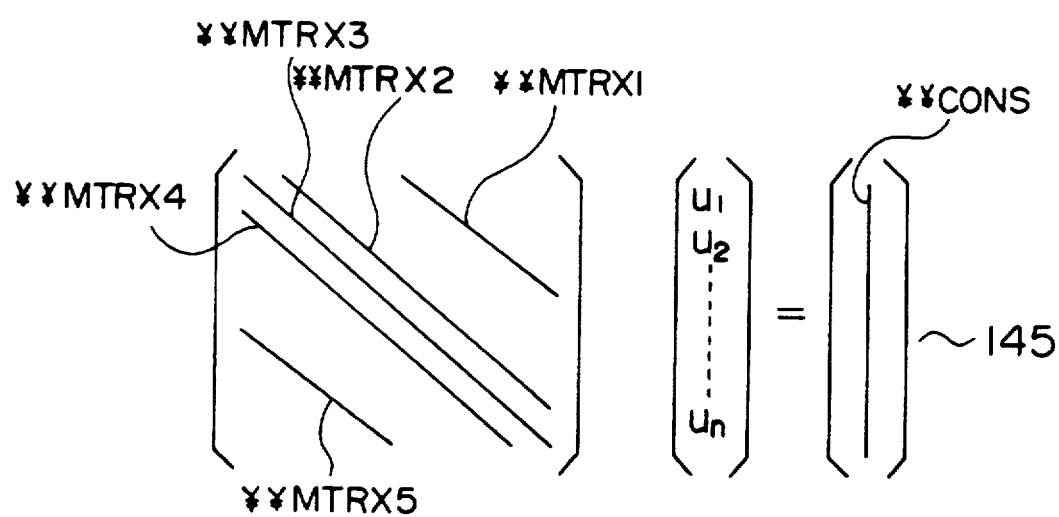
FIG. 5B shows simultaneous linear equations which are formed of the coefficients and constants appearing in the program of FIG. 5A and are expressed by using matrices.
Figure 14:
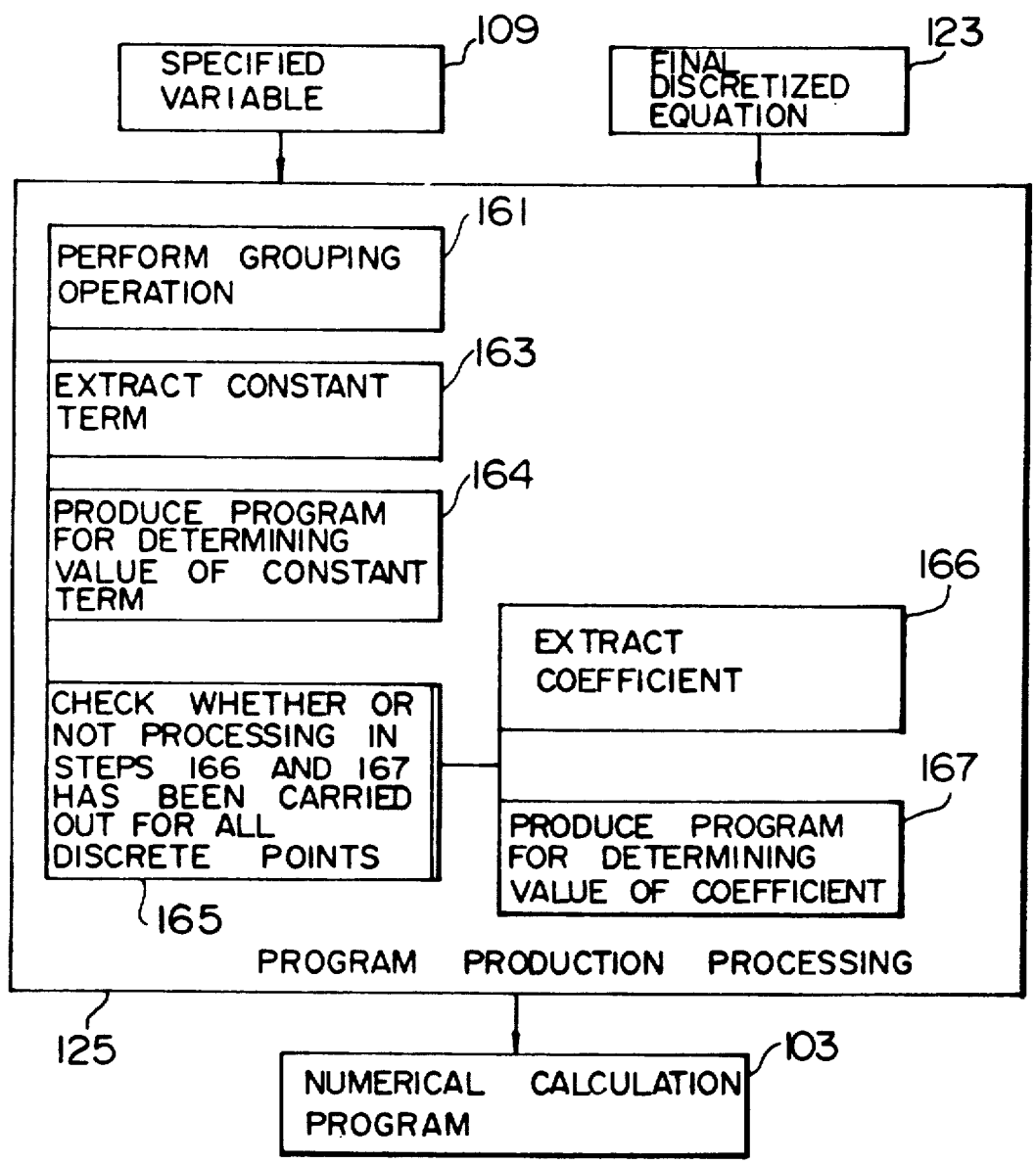
FIG. 14 is a flow chart showing the program production processing 125 of FIG. 2.

The program production processing 125 will be explained below in detail, with reference to FIG. 14. In the processing 125, the numerical calculation program 103 is produced from the final discretized equation 123 and the input information 109 on a specified variable. Referring to FIG. 14, a grouping operation is performed in the final discretized equation 123, with respect to the variable specified by the input information 109 (step 161). That is, coefficients which belong to the value of the specified variable at one discrete point and appear in the final discretized equation 123, are put in parenthesis. For example, the final discretized equation for the equation LAPL(u)=α of FIG. 3 has the form shown in FIG. 15. It is to be noted that terms obtained by discretizing the partial differential operator with respect to y are omitted from FIG. 15 for brevity's sake. Further, it is to be noted that although the size of a control volume in the X-direction is indicated by Δx in FIG. 1. a size Δx, is used in FIG. 15 as a substitute for Δx. for the following reason. The position of the control volume 501A of FIG. 1 can be determined so that the center of the control volume 501A deviates from the discrete point A(i,j) in the X-direction In this case, the distance between the point A and the left side of the control volume is different from the distance between the point A and the right side of the control volume. Accordingly, when the discretization is carried out for the control volume, it is necessary to discriminate between the former distance and the latter distance. In FIG. 15, the former distance is indicated by $\Delta x_i$, and the latter distance is indicated by $\Delta x_{i-1}$. When a grouping operation is performed for the final discretized equation of FIG. 15, an equation 170 shown in FIG. 16 is obtained. Referring back to FIG. 14, a term which does not include the specified variable, is extracted from the equation having been subjected to the grouping operation (step 163). In the case shown in FIG. 16, a constant term ($-a$) is extracted. In step 164, a program for determining the value of the extracted constant term is produced. Then, the coefficients of the values of the specified variable at different points are extracted (step 166). For example, in the case shown in FIG. 16, reference numerals 172, 173 and 174 designate the coefficients of the values $u_{i-1,j}$, $u_{i,j}$ and $u_{i-1,j}$ of the vaiable u at three discrete points, respectively. In step 167, a program for determining the value of each coefficient is produced. It is required to carry out the processing of FIG. 14 for all of the inner discrete points and discrete points on the boundary line. FIG. 5A shows a main part of a numerical calculation program 103 made by the above-mentioned processing. Although only two "DO"-loops are shown in FIG. 5A for the sake of simplicity, the numerical calculation program 103 includes five "DO"-loops. These "DO"-loops indicate code groups for determining the constants and coefficients included in discretized equation groups for discrete points on four sides of the analytic domain 130 of FIG. 4 and a discrete point within the domain 130. For example, a "DO"-loop 141 shown in FIG. 5A has a statement ≭ ≭CONS(INDX) for determining the value of the constant term included in the discretized equation for each of discrete points on the left boundary side (which is given by an equation y = 1), and a statement≭ ≭MTRX3(INDEX) for determining the values of the coefficients included in the above discretized equation. Further, a "DO"-loop 142 has a statement ≭ ≭CONS(INDX) for determining the value of the constant term included in the discretized equation for each of discrete points within the analytic domain 130, and statements ≭≭ MTRX1(INDX) to ≭≭ MTRX5(INDX) for determining the values of the coefficients included in the above discretized equation. In more detail, the statements≭ ≭ MTRX1(INDX). ≭≭ MTRX2(INDX). ≭ ≭ MTRX3(INDX). ≭ ≭MTRX4(INDX) and≭ ≭ MTR5(INDX) determine the values of the coefficients of the factors $u_{i,j+1}$, $u_{i-1,j}$, $u_{i,j}$, $u_{i+1,j}$ and $u_{i,j-1}$, respectively. The constant term and coefficients included in each of discretized equations for all the discrete points are inserted in the numerical calculation program 103. The above statements≭ ≭CONS(INDX) and≭ ≭MTRX1(INDX) to ≭ ≭MTRX5(INDX) define simultaneous equations 145 shown in FIG. 5B. By solving the simultaneous equations 145 for the variable u, values $u_1$, $u_2$, and so on of the variable u can be obtained. It is to be noted that a program for solving the equation 145 of FIG. 5B, is omitted from FIG. 5A for brevity's sake.

As has been explained in the foregoing, according to the present embodiment, a numerical calculation program according to the control volume method can be automatically produced. Further, the present embodiment has the following advantages. In a case where a boundary condition necessary for the discretization for a discrete point on the boundary line is not included in the input information 101, an alarm is generated, to inform the user that the inputted boundary condition does not match the inputted partial differential equation. Even in this case, a discretized equation can be formed by using the finite difference method on one side, and the discretized equation thus obtained is used for producing a numerical calculation program. The user can utilize this program, if necessary.

Further, when discretization rules for the differential operator indicating the divergence of an operand is specified by the user in the present embodiment, discretization is carried out on the basis of the specified rules. Thus, the simulation of physical phenomena in a wide range is possible. It is needless to say that discretization rules for the differential operator indicating the gradient of an operand can be specified by the user, and the discretization can be carried out on the basis of the specified rules.

I claim:

1. A method for producing a numerical calculation program, written in a language which does not include a differential operator, for calculating, in a domain, values of a physical quantity defined by a partial differential equation from input information written in a language which includes a differential operator, comprising the following steps executed by a computer:
   (a) dividing a domain defined by the input information into a plurality of meshes;
   (b) discretizing each of terms of a partial differential equation included in the input information to produce a linear equation indicative of a relation between a value of the physical quantity at a vertex of a mesh discretization point and the values of the physical quantity at neighboring discretization points, the second step (b) including the steps of:
   (b1) judging whether or not each of terms having a differential operator is to be discretized on the basis of partial integration thereof at a control volume containing the discrete discretization point, depending upon whether or not the term satisfies a predetermined condition,
   (b2) carrying out the discretization of the term based upon the partial integration when a result of the judging step (b1) is affirmative for the term; and
   (c) producing a program for calculating a value of the physical quantity at each discretization point, on the basis of the produced linear equation.

2. A method according to claim 1, wherein the predetermined conditions includes a condition with respect to a rank of the partial differential equation and a kind of a differential operator included in a term.

3. A method according to claim 2, wherein the predetermined conditions includes a condition that the partial differential equation has a second rank and a term to be discretized has an outer differential operator of a differential operator of a second rank.

4. A method according to claim 2, wherein the predetermined condition includes a condition that the partial differential equation has a second rank and a term to be discretized has a differential operator of a first rank.

5. A method according to claim 2, wherein the predetermined condition includes a condition that the partial differential equation has a first rank and a term to be descretized has differential operator.

6. A method according to claim 1, wherein the predetermined condition includes a condition that a term to be discretized has a differential operator "div".

7. A method according to claim 1, wherein the predetermined condition includes a condition that a term to be descretized has a differential operator "rot".

8. A method according to claim 1, wherein the step (b) further includes a step of discretizing a term by using an approximation equation obtained by a Taylor expansion if the term does not satisfy the predetermined condition.

9. A method according to claim 1, wherein the step (b2) includes a step (b3) of carrying out discretization of a term of the partial differential equation for a discretization point on a boundary of the domain, based upon partial integration of the term at a control volume which includes the discretization point on a boundary thereof.

10. A method according to claim 9, wherein the step (b) further includes a step (b4) of replacing a term having a differential operator, included in a result of the discretization carried out in the step (b3), by a value thereof determined by an inputted boundary condition, when the boundary condition includes a condition on the term.

11. A method according to claim 9, wherein the step (b) further includes a step (b4) of generating an alarm to stop further processing, when input boundary condition is devoid of a condition on a term having a differential operator, included in a result of discretization carried out in the step (b3).

12. A method according to claim 9, wherein the step (b2) further includes carrying out discretization of the term using a value of the discrete discretization point when the judging step (b1) is negative to the term, to thereby produce a linear equation for each discrete point from the differential equation.

* * * * *